US011923108B2

(12) United States Patent
Lavesson et al.

(10) Patent No.: US 11,923,108 B2
(45) Date of Patent: Mar. 5, 2024

(54) INSULATOR SHED HAVING NON-CIRCULAR TIP

(71) Applicant: HITACHI ENERGY LTD, Zürich (CH)

(72) Inventors: Nils Lavesson, Västerås (SE); Olof Hjortstam, Västerås (SE)

(73) Assignee: HITACHI ENERGY LTD, Zürich (CH)

(*) Notice: Subject to any disclaimer, the term of this patent is extended or adjusted under 35 U.S.C. 154(b) by 254 days.

(21) Appl. No.: 17/634,697

(22) PCT Filed: Oct. 2, 2020

(86) PCT No.: PCT/EP2020/077676

§ 371 (c)(1),
(2) Date: Feb. 11, 2022

(87) PCT Pub. No.: WO2021/078495

PCT Pub. Date: Apr. 29, 2021

(65) Prior Publication Data

US 2022/0328215 A1 Oct. 13, 2022

(30) Foreign Application Priority Data

Oct. 21, 2019 (EP) .................................... 19204259

(51) Int. Cl.
*H01B 17/42* (2006.01)

(52) U.S. Cl.
CPC .................................. *H01B 17/42* (2013.01)

(58) Field of Classification Search
CPC ....... H01B 17/26; H01B 17/42; H01B 17/525
See application file for complete search history.

(56) References Cited

U.S. PATENT DOCUMENTS 1,854,459 A * 4/1932 Dienner ................ H01B 17/52 174/211
4,174,464 A * 11/1979 Kawaguchi ........... H01B 17/42 174/211

(Continued)

FOREIGN PATENT DOCUMENTS

CH 204355 A 4/1939
CH 640666 A5 1/1984

(Continued)

OTHER PUBLICATIONS

International Search Report and Written Opinion of the International Searching Authority, PCT/EP2020/077676, dated Dec. 9, 2020, 17 pages.

(Continued)

*Primary Examiner* — William H. Mayo, III
*Assistant Examiner* — Rhadames Alonzo Miller
(74) *Attorney, Agent, or Firm* — Sage Patent Group

(57) ABSTRACT

An insulator for electrically insulating an electrical conductor. The insulator includes a roll defining a central longitudinal through hole along a longitudinal axis of the insulator. The through hole is arranged for allowing an electrical conductor to pass there through. The insulator also includes at least one shed arranged on an outer surface of the roll. The shed includes a shed tip having an outer non-flat curvature defined by a plurality of different radii of curvature and including a most distal point of the shed. An end radius of curvature at the most distal point of the curvature is larger than a first radius of curvature at one side of the most distal point and a second radius of curvature at the other side of the most distal point.

20 Claims, 3 Drawing Sheets

(56) References Cited

U.S. PATENT DOCUMENTS

| | | | | | |
|---|---|---|---|---|---|
| 4,476,155 | A * | 10/1984 | Niemi | C08L 83/04 | 252/573 |
| 4,749,824 | A * | 6/1988 | Orbeck | H01B 17/42 | 524/588 |
| 4,803,311 | A * | 2/1989 | Moriya | H01B 17/08 | 174/196 |
| 5,389,734 | A | 2/1995 | Darcy et al. | | |
| 7,154,036 | B2 * | 12/2006 | Lynch | H02G 7/00 | 174/138 F |
| 7,839,256 | B2 * | 11/2010 | Bradford | H01B 17/00 | 337/186 |
| 8,618,412 | B2 * | 12/2013 | Lynch | H01B 17/00 | 119/713 |
| 8,772,633 | B2 * | 7/2014 | Behnken | H01B 19/00 | 174/138 R |
| 8,957,314 | B2 * | 2/2015 | Niles | H02G 7/00 | 174/172 |
| 10,881,097 | B2 * | 1/2021 | Lynch | H01B 17/56 | |
| 10,958,046 | B2 * | 3/2021 | Lynch | H02B 1/06 | |
| 2002/0100605 | A1 * | 8/2002 | Ramarge | H01B 17/50 | 174/137 A |
| 2006/0003622 | A1 * | 1/2006 | Lynch | H02G 7/00 | 439/404 |
| 2007/0102783 | A1 * | 5/2007 | Waters | H01B 17/50 | 257/510 |
| 2008/0128163 | A1 * | 6/2008 | Bradford | H01H 31/127 | 174/5 R |
| 2009/0071684 | A1 * | 3/2009 | Zhang | H02G 15/064 | 174/73.1 |
| 2010/0218988 | A1 * | 9/2010 | Lynch | H02G 7/00 | 174/5 R |
| 2011/0017488 | A1 | 1/2011 | Denndorfer et al. | | |
| 2012/0205139 | A1 * | 8/2012 | Cotton | H01B 17/12 | 174/162 |
| 2013/0299230 | A1 * | 11/2013 | Lynch | H01B 17/00 | 174/5 R |
| 2015/0114678 | A1 * | 4/2015 | Lynch | H02G 7/00 | 29/887 |
| 2016/0284447 | A1 | 9/2016 | Johansson et al. | | |
| 2022/0413241 | A1 * | 12/2022 | Baker | G02B 6/483 | |

FOREIGN PATENT DOCUMENTS

| | | | |
|---|---|---|---|
| CN | 200962512 | Y | 10/2007 |
| CN | 102254644 | A | 11/2011 |
| CN | 103366908 | A | 10/2013 |
| CN | 107359022 | A | 11/2017 |
| CN | 108053955 | A | 5/2018 |
| GB | 514862 | A | 11/1939 |
| JP | H0547248 | A | 2/1993 |
| JP | 2013229312 | A | 11/2013 |

OTHER PUBLICATIONS

Extended European Search Report dated Apr. 23, 2020 for European Patent Application No. 19204259.6, 10 pages.
ABB, Hollow composite insulators 72-1, 200 kV Design for reliable performance, Brochure, Jun. 30, 2013, 13 pages.
First Office Action for Chinese Invention Patent Application No. 2020800611672, dated Apr. 28, 2023, 7 pages.
Search Report for Chinese Invention Patent Application No. 2020800611672, dated Apr. 27, 2023, 3 pages.

* cited by examiner

INSULATOR SHED HAVING NON-CIRCULAR TIP

CROSS REFERENCE TO RELATED APPLICATIONS

This application is a 35 U.S.C. § 371 national stage application of PCT International Application No. PCT/EP2020/077676 filed on Oct. 2, 2020, which in turn claims foreign priority to European Patent Application No. 19204259.6, filed on Oct. 21, 2019, the disclosures and content of which are incorporated by reference herein in their entirety.

TECHNICAL FIELD

The present disclosure relates to a shed for an insulator of an electrical conductor.

BACKGROUND

The outermost structure of a range of power products, e.g. bushings, instrument transformers, cable terminations, breakers, surge arrestors and other insulators, is often made up of sheds. The sheds serves several purposes. They increase the creep path from voltage to ground, increasing the flashover voltage. They also act as weather protection in the case of outdoor equipment. The tips of the sheds are however rather narrow which leads to significant electric field increase in the vicinity of the tips, especially for sheds where the electrical conductor passes longitudinally through the roll of the insulator, generating radial electrical fields.

A high radial electric field outside the shed tips can lead to a corona discharge which degrades the material and leads to losses. There is also a limit on discharges during product testing. Increasing the shed thickness is possible to a degree but adds significant material cost.

SUMMARY

It is an objective of the present disclosure to provide a shed having a reduced electrical field at the shed tip, without compromising other desired properties, such as creep distance, and without additional material cost.

According to an aspect of the present disclosure, there is provided an insulator for electrically insulating an electrical conductor. The insulator comprises a roll defining a central longitudinal through hole along a longitudinal axis of the insulator. The through hole is arranged for allowing an electrical conductor to pass there through. The insulator also comprises at least one shed arranged on an outer surface of the roll. The shed comprises a shed tip having an outer non-flat curvature defined by a plurality of different radii of curvature and comprising a most distal point of the shed. An end radius of curvature at the most distal point of the curvature is larger than a first radius of curvature at one side of the most distal point and a second radius of curvature at the other side of the most distal point.

According to another aspect of the present disclosure, there is provided a method of producing an insulator. The method comprises extruding at least one shed onto an outer surface of a roll defining a central longitudinal through hole along a longitudinal axis of the insulator. The shed comprises a shed tip having an outer non-flat curvature defined by a plurality of different radii of curvature and comprising a most distal point of the shed. An end radius of curvature at the most distal point of the curvature is larger than a first radius of curvature at one side of the most distal point and a second radius of curvature at the other side of the most distal point.

In an insulator where the electrical conductor passes through a central longitudinal through hole of the roll of the insulator, the electrical field formed will be substantially radial, implying that an electrical field will be formed outside the radially most distant, herein also called distal, parts of the shed, i.e. at the shed tips. By means of a relatively large radius of curvature at the most distal point of the shed, the electrical field at said point may be reduced. On the other hand, it is not desired with a flat surface (the radius of curvature nearing infinity) at the most distal point, i.e. a surface parallel with the longitudinal axis of the insulator, since this would instead concentrate the electrical field to either side of said flat surface.

To achieve the desired curvature in accordance with the disclosure, it may not be possible to use traditional materials, such as porcelain, or production methods, such as casting, for producing the insulator. Instead, the sheds may be formed by extrusion onto the roll of the insulator.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
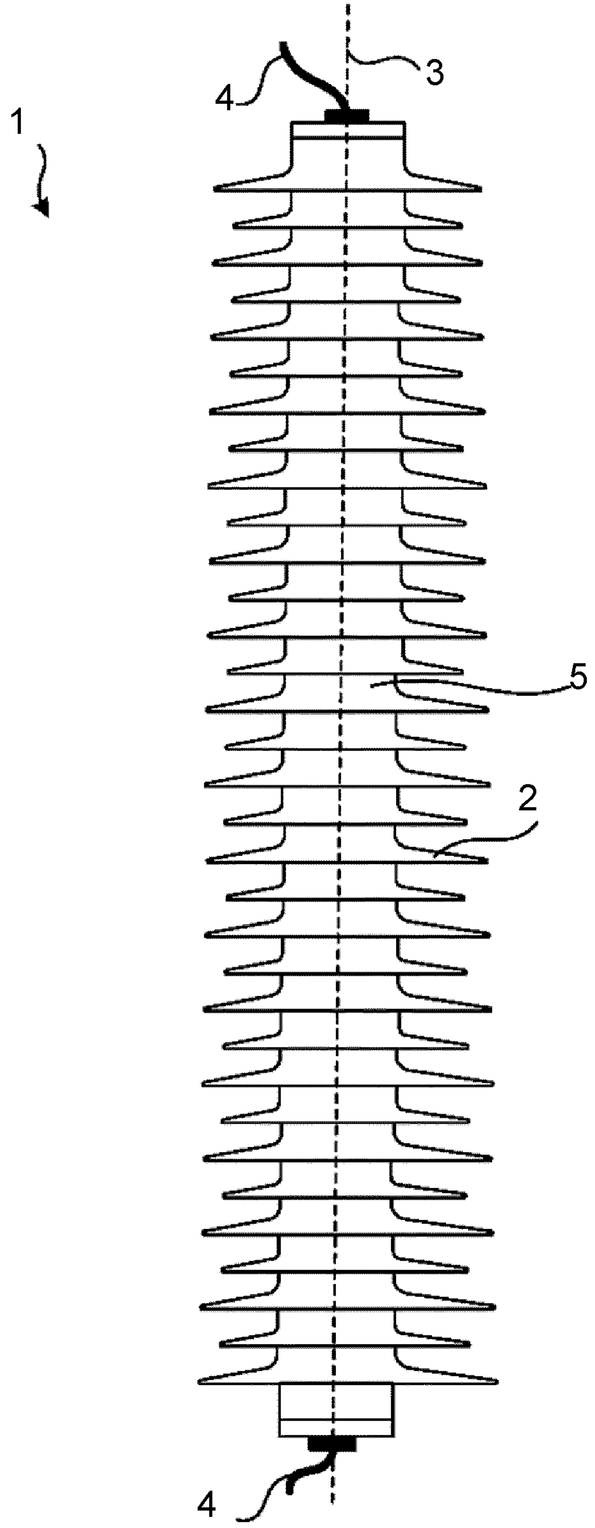
FIG. 1 is a schematic side view of an electrical insulator, in accordance with an embodiment of the present disclosure.

FIG. 1 illustrates an insulator 1, electrically insulating an electrical conductor 4 which passes through a central longitudinal through hole of a roll 5 of the insulator along a longitudinal axis 3 of the insulator. The insulator 1 is formed by the roll 5 having a plurality of radial circumferential sheds 2 arranged on an outer surface of the roll. Each shed 2 extends outwardly (typically substantially radially) from the outer surface of the roll 5 and around the roll (circumferentially), substantially in a plane which is orthogonal to the longitudinal axis 3. The sheds 2 are arranged along the roll 5, one after the other, typically substantially along the whole longitudinal extension of the roll.

In an alternative embodiment, the sheds 2 may be formed from a continuous or discontinuous spiral around the roll 5 and along the longitudinal axis 3.

The roll 5 defines the central longitudinal through hole of the insulator 1, through which hole the electrical conductor 4 may pass. However, also other components may be arranged within the roll 5, e.g. a condenser core arranged between the roll 5 and the conductor 4. The roll 5 may be of any rigid electrically insulating material, e.g. comprising a thermosetting or curable resin, such as epoxy. The roll may be reinforced, e.g. by glass fibres. One material for forming the roll 5 is glass fibre reinforced epoxy, for example.

The roll 5 may be cylindrical, as in FIG. 1, but may in other embodiments, e.g. along its whole length or along a part of its length, be conical, e.g. to connect a smaller diameter insulation with a larger diameter insulation of e.g. a transformer bushing.

The conductor 4 may e.g. be a hollow tube of an electrically conducting material, such as copper and/or aluminium.

The sheds 2 may be extruded onto the roll 2, and the sheds may be made from an electrically insulating extrudable material, e.g. comprising an elastomer such as a silicone rubber.

Embodiments of the insulator 1 may be used in e.g. electrical bushings, instrument transformers, cable terminations, breakers, surge arrestors etc., especially where a radial electrical field is formed. It is envisioned that the insulator may be especially useful in high-voltage (HV) bushings, e.g. transformer bushings.

Figure 2:
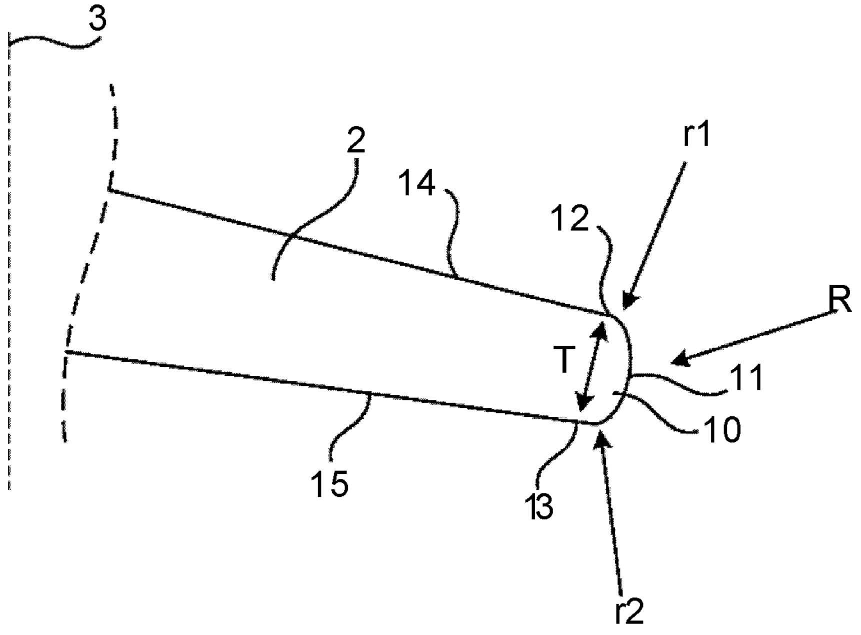
FIG. 2 is a schematic detail of a longitudinal section of an insulator, showing a cross section of a shed, in accordance with an embodiment of the present disclosure.
Figure 3:
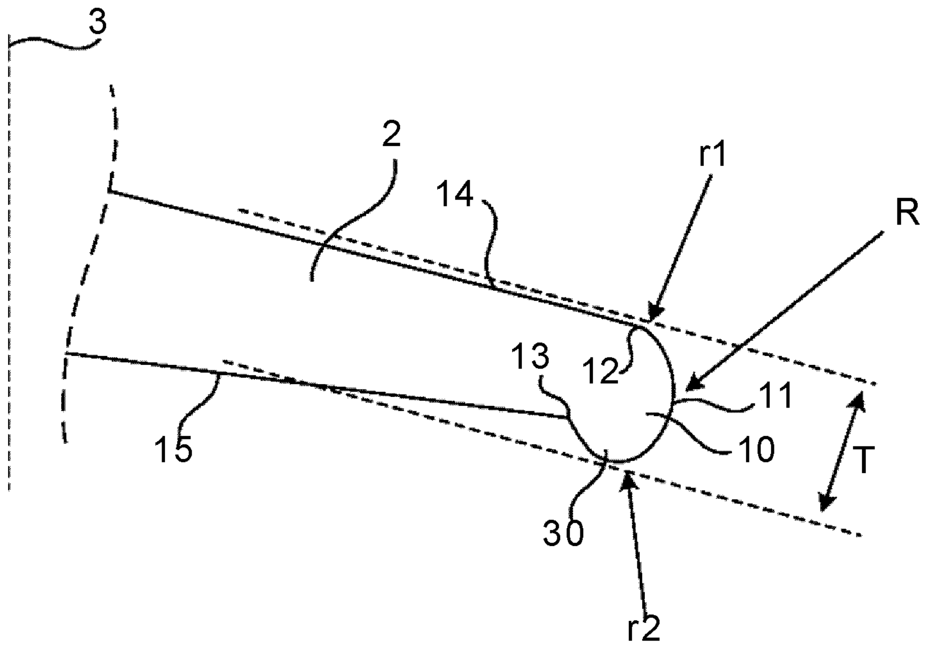
FIG. 3 is a schematic detail of a longitudinal section of an insulator, showing a cross section of a shed comprising a drip edge at its shed tip, in accordance with an embodiment of the present disclosure.

FIGS. 2 and 3 illustrate a cross section of a shed 2 formed by making a longitudinal section of the insulator 1, e.g. an insulator as in FIG. 1. The shed may have a substantially flat first surface 14, herein called an upper surface since it is typically intended to form an upper surface when the insulator is installed, and a substantially flat second surface 15, herein called a lower surface since it is typically intended to form a lower surface when the insulator is installed.

Connecting the upper and lower surfaces 14 and 15 to each other, there is a convex curved, e.g. ellipsoid, end surface which is in the sectional FIGS. 2 and 3 defined as a convex curvature ii of a distal circumferential end portion 10 of the shed 2 which is herein called a shed tip 10. The curvature 11 comprises the most distal point (corresponding to e.g. a circle or a spiral when viewed in three dimensions instead of in section) of the shed tip 10. A first point 12 marks the transition between the flat upper surface 14 and the curvature 11, and a second point 13 marks the transition between the flat lower surface 15 and the curvature 11. The shed tip 10 may in the sectional FIGS. 2 and 3 be defined as the portion of the shed which is on the distal side (with respect to the central longitudinal axis 3) of a straight line between the first and second points 12 and 13. The three-dimensional shed tip 10 may then be formed by the rotation of the two dimensional section in FIGS. 2 and 3 about the longitudinal axis 3, if the shed 2, as well as the roll 5, are rotationally symmetrical as in the embodiment of FIG. 1.

In accordance with the present disclosure, the curvature 11 is defined by a plurality of different radii of curvature R, r1 and r2 (i.e. the curvature is not circular). The radius of curvature at the most distal point (in relation to the longitudinal axis 3) of the curvature is herein called the end radius of curvature R. In addition to the end radius of curvature R, the curvature 11 has a first radius of curvature r1, which may be called an upper radius of curvature, which is a radius of curvature of a portion of the curvature 11 between the most distal point and the first point 12, and a second radius of curvature r2, which may be called a lower radius of curvature, which is a radius of curvature of a portion of the curvature 11 between the most distal point and the second point 13.

In accordance with the present disclosure, the end radius of curvature R is larger than both the first radius of curvature r1 and the second radius of curvature r2, i.e. $R>r1$ and $R>r2$. The first and second radii of curvature r1 and r2 may be the same or different, but both are smaller than the end radius of curvature R. The curvature 11 is thus flattened, but not flat, at its most distal point, e.g. being elliptical in shape. In some embodiments, the end radius of curvature R is at least twice as large as the first radius of curvature r1 and/or at least twice as large as the second radius of curvature r2, i.e. $R>2r1$ and/or $R>2r2$.

A tip thickness T may be defined as a largest thickness of the shed tip 10 of the shed 2 in the section of FIGS. 2 and 3. As mentioned above, the shed tip 10 may be delimited by a straight line between the first point 12 marking the transition between the substantially flat upper outer surface 14 of the shed tip 2 and the curvature 11, and the second point 13 marking the transition between the substantially flat lower outer surface 15 of the shed 2 and the curvature 11.

In the embodiment of FIG. 2, the shed tip 10 is thickest between the first and second points 12 and 13. In contrast, the embodiment of FIG. 3 comprises a drip edge 30 (could alternatively be called a drip-lip) arranged at the lower part of the shed tip to facilitate drip formation and to prevent moisture from flowing from the end surface of the shed to the lower surface 15. In the embodiment of FIG. 3, the tip thickness T is thus instead defined between the first point 12 and a point at the bottom of the drip edge 30 between the most distal point and the second point 13.

In some embodiments of the present disclosure, the end radius of curvature R is larger than half of the tip thickness T, i.e. $R>T/2$, e.g. equal to or larger than the tip thickness T, i.e. $R\geq T$. In some embodiments, the end radius of curvature R is within the range of 0.6T to 10T, e.g. within the range of 0.7T to 3T.

In some embodiments of the present disclosure, the first radius of curvature r1 and/or the second radius of curvature r2 is smaller than half the tip thickness T, i.e. $r1,r2<0.5T$, e.g. equal to or smaller than a quarter of the tip thickness, i.e. $r1,r2\leq 0.25T$.

In some embodiments of the present disclosure, the first radius of curvature (r1) and/or the second radius of curvature (r2) is within the range of 0.05T to 0.45T, e.g. within the range of 0.1T to 0.4T.

Figure 4:
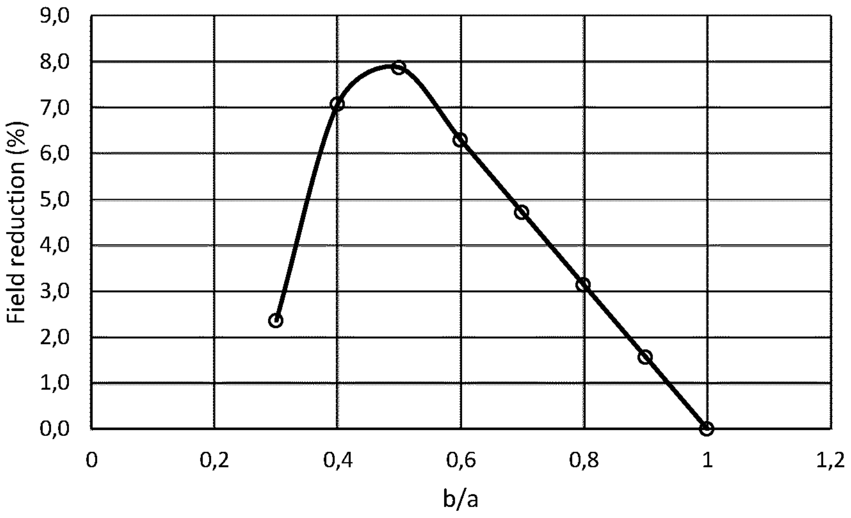
FIG. 4 is diagram showing a simulation of field reduction as a function of the radius of curvature of the shed tip.
Figure 5:
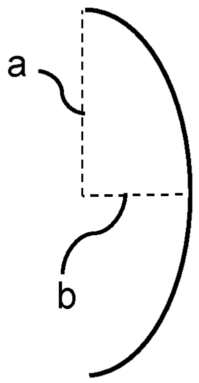
FIG. 5 is the shed tip simulated in FIG. 4, having an elliptical cross section with an axis a and an axis b.

FIG. 4 is a diagram of a simulation which shows how the field at the shed tip is reduced as a function of the relation between an axis a and an axis b of a simplified shed tip having an elliptic cross section, as shown in FIG. 5. The simulation is further based on typical dimensions for a shed of an insulator.

When the relation b/a is 1, the cross section of the shed tip is circular, i.e. perfectly rounded. As b/a is reduced the field is also reduced, but attains a maximum when b/a is approximately 0.5. This is because the first radius of curvature r1 and the second radius of curvature r2 have not been considered, which yields abrupt transitions between the flat upper and lower outer surfaces of the shed tip and the curvature of the end of the shed tip. When the first radius of curvature r1 and the second radius of curvature r2 are included in the simulation, the left part of the curve shown in FIG. 4 may be substantially improved, giving a field reduction of 10-15%.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An insulator for electrically insulating an electrical conductor, the insulator comprising:

a roll defining a central longitudinal through hole along a longitudinal axis of the insulator, arranged for allowing an electrical conductor to pass there through; and at least one shed arranged on an outer surface of the roll, the shed comprising a shed tip having an outer non-flat curvature defined by a plurality of different radii of curvature and comprising a most distal point of the shed, and an end radius of curvature at the most distal point of the curvature being larger than a first radius of curvature at one side of the most distal point and a second radius of curvature at the other side of the most distal point.

2. The insulator of claim 1, wherein at least one of the end radius of curvature is at least twice as large as the first radius of curvature and the second radius of curvature.

3. The insulator of claim 1, wherein a tip thickness is defined as a largest cross sectional thickness of the shed tip of the shed, the shed tip being delimited by a straight line between a first point marking a transition between a substantially flat upper outer surface of the shed and the curvature and a second point marking a transition between a substantially flat lower outer surface of the shed and the curvature; and wherein the end radius of curvature is larger than half of the tip thickness.

4. The insulator of claim 3, wherein the end radius of curvature is within the range of 0.6 times the tip thickness to 10 times the tip thickness.

5. The insulator of claim 3, wherein at least one of the first radius of curvature and the second radius of curvature is smaller than half the tip thickness.

6. The insulator of claim 3, wherein at least one of the first radius of curvature and the second radius of curvature is within the range of 0.05 times the tip thickness to 0.45 times the tip thickness.

7. The insulator of claim 1, wherein the shed tip comprises a drip edge.

8. The insulator of claim 1, wherein the at least one shed is of an extrudable material.

9. The insulator of claim 1, wherein the roll is of a material comprising a resin.

10. The insulated conductor of claim 1, wherein the end radius of curvature is at least twice as large as at least one of the first radius of curvature and the second radius of curvature.

11. The insulated conductor of claim 1, wherein a tip thickness is defined as a largest cross sectional thickness of the shed tip of the shed, the shed tip being delimited by a straight line between a first point marking a transition between a substantially flat upper outer surface of the shed and the curvature and a second point marking a transition between a substantially flat lower outer surface of the shed and the curvature; and wherein the end radius of curvature is equal to or larger than the tip thickness.

12. The insulated conductor of claim 3, wherein the end radius of curvature is within the range of 0.7 times the tip thickness to 3 times the tip thickness.

13. The insulated conductor of claim 3, wherein at least one of the first radius of curvature and the second radius of curvature is equal to or smaller than a quarter of the tip thickness.

14. The insulated conductor of claim 3, wherein at least one of the first radius of curvature and the second radius of curvature is within the range of 0.1 times the tip thickness to 0.4 times the tip thickness.

15. The insulated conductor of claim 1, wherein the shed tip comprises a drip edge.

16. The insulated conductor of claim 1, wherein the at least one shed comprises an extrudable elastomer.

17. The insulated conductor of claim 1, wherein the roll comprises an epoxy.

18. The insulated conductor of claim 17, wherein the epoxy comprises a glass fibre reinforced epoxy.

19. A method of producing an insulator, the method comprising extruding at least one shed onto an outer surface of a roll defining a central longitudinal through hole along a longitudinal axis of the insulator, the shed comprising a shed tip having an outer non-flat curvature defined by a plurality of different radii of curvature and comprising a most distal point of the shed, and an end radius of curvature at the most distal point of the curvature being larger than a first radius of curvature at one side of the most distal point and a second radius of curvature at the other side of the most distal point.

20. An insulated conductor comprising:

an electrical conductor; and an insulator electrically insulating an electrical conductor, the insulator comprising:

a roll defining a central longitudinal through hole along a longitudinal axis of the insulator, the electrical conductor arranged there through; and at least one shed arranged on an outer surface of the roll, the shed comprising a shed tip having an outer non-flat curvature defined by a plurality of different radii of curvature and comprising a most distal point of the shed, and an end radius of curvature at the most distal point of the curvature being larger than a first radius of curvature at one side of the most distal point and a second radius of curvature at the other side of the most distal point.

* * * * *